United States Patent [19]

Keen et al.

[11] 4,055,616
[45] Oct. 25, 1977

[54] METHOD FOR SEPARATING SECTIONS OF A COVERING ON A CABLE

[75] Inventors: Ralph H. Keen, Arvada; Gary G. Seaman, Broomfield, both of Colo.

[73] Assignee: Western Electric Company, Inc., New York, N.Y.

[21] Appl. No.: 647,249

[22] Filed: Jan. 7, 1976

[51] Int. Cl.² ............................................. B23P 19/02
[52] U.S. Cl. .................................... 264/139; 29/427; 81/9.5 R; 156/344; 219/68
[58] Field of Search ............... 156/251, 344, 584, 250; 29/427; 81/9.5 R, 9.1; 134/19; 30/90.1; 57/159; 219/68; 264/138, 139

[56] References Cited

U.S. PATENT DOCUMENTS

| 2,432,868 | 12/1947 | Earl et al. | 134/19 |
| 2,636,408 | 4/1953 | Mitchell | 81/9.51 |
| 3,659,332 | 5/1972 | Morrone | 29/427 |
| 3,662,453 | 5/1972 | Meal et al. | 156/584 |
| 3,953,706 | 4/1976 | Harris et al. | 81/9.5 R |

Primary Examiner—Charles E. Van Horn
Assistant Examiner—Jerome W. Massie
Attorney, Agent, or Firm—R. P. Miller

[57] ABSTRACT

A leading end portion of a thermoplastic jacketed cable is desheathed by applying heat from a movable, continuously operating annular radiant heat source to heat-soften a narrow (e.g., on the order of ⅛ of an inch or less) annular section of the jacket without contacting the jacket. A gripper slide assembly is moved parallel to the cable to grip and apply tension on the leading end portion of the jacket to separate the jacket along the heat-softened section and to remove the leading end portion of the jacket from the cable. After the slide assembly has moved sufficiently to cause separation of the jacket, the heat source is moved axially of the cable from the area of jacket separation so as to preclude damage to the insulation on the cable conductors and to permit the heat softened material of the jacket remaining on the cable to reharden and form a smooth edge along the line of separation. In another embodiment of the invention, the heat source may be energized and subsequently de-energized to achieve the heat-softening of the jacket and to preclude damage to the insulation on the cable conductors.

5 Claims, 7 Drawing Figures

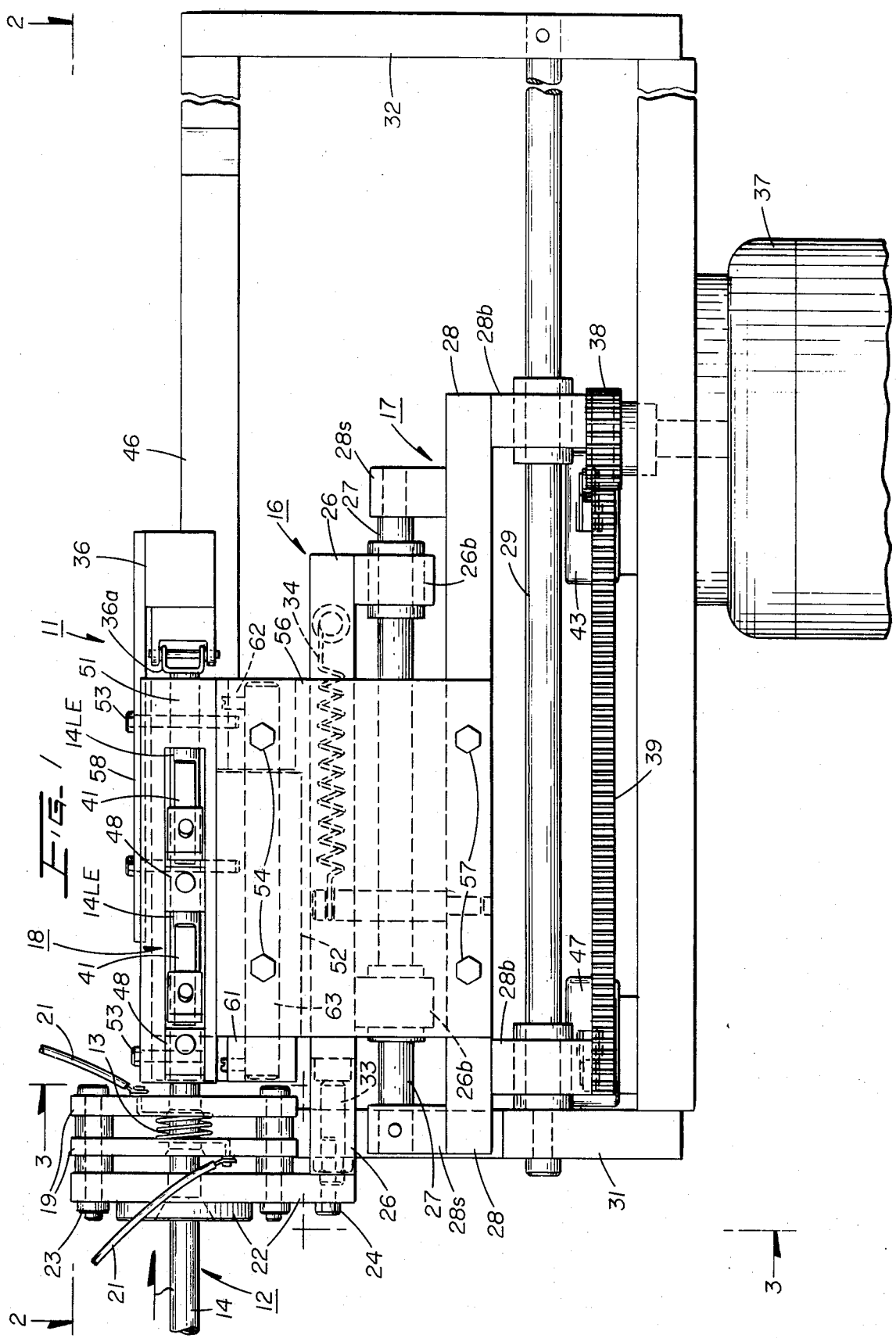

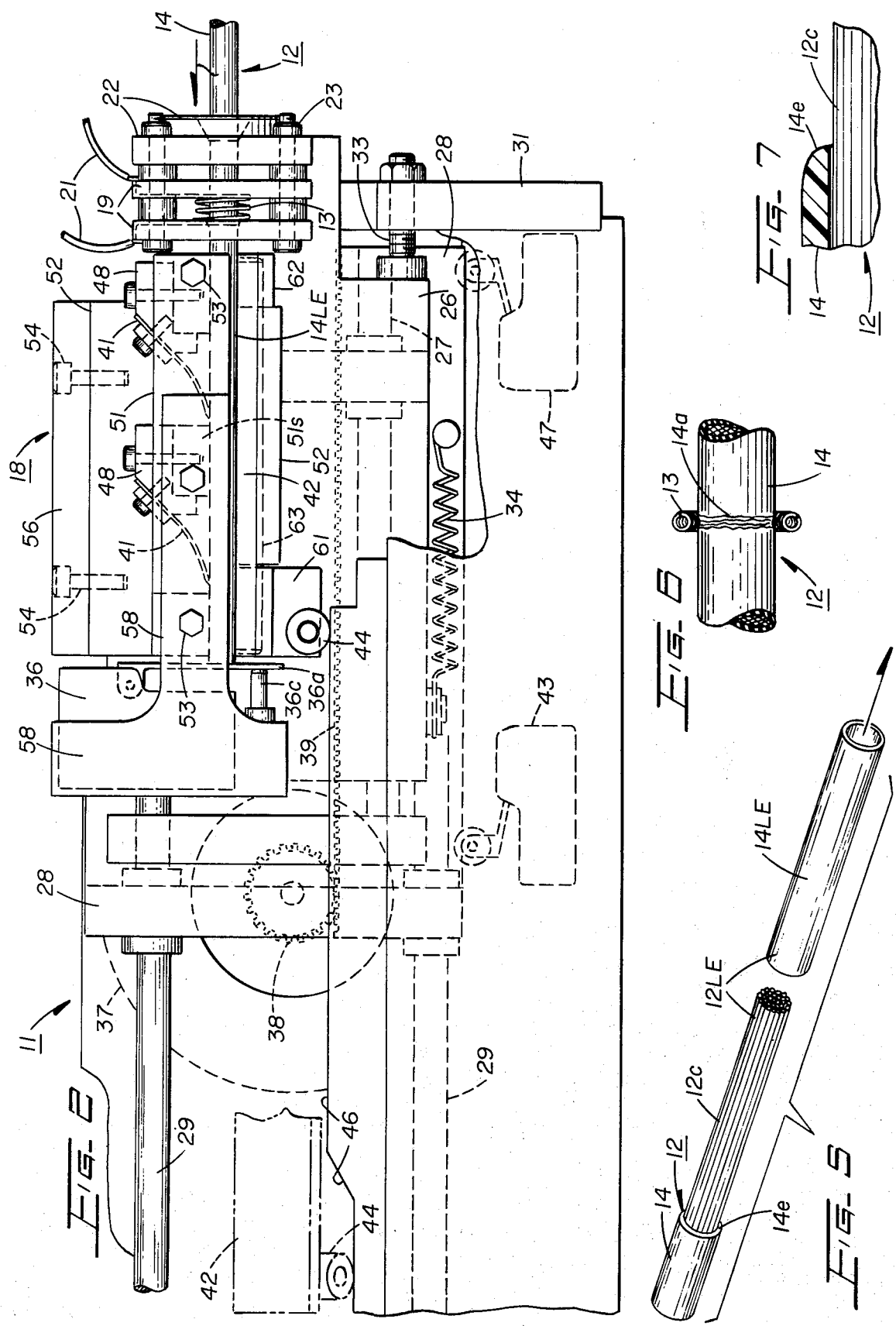

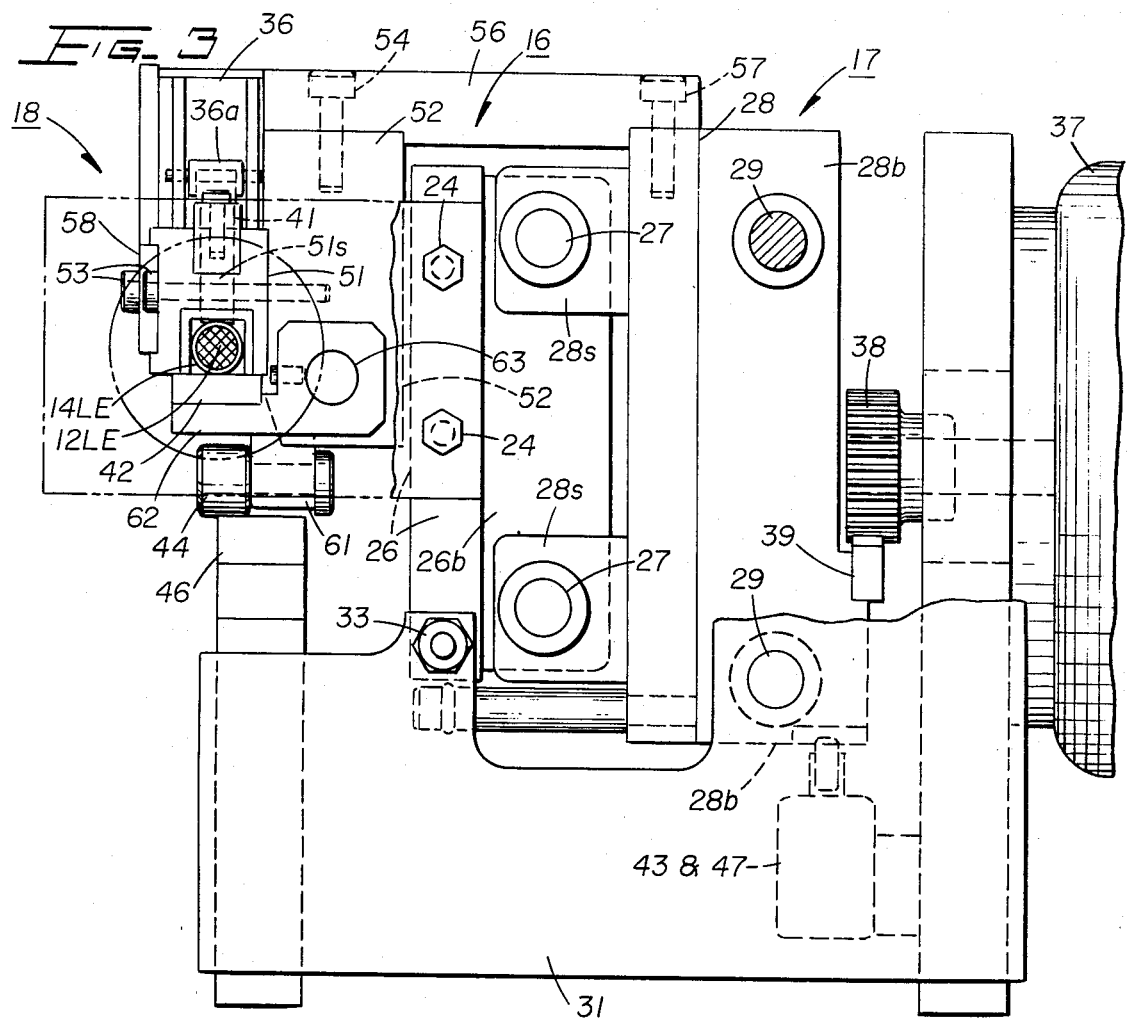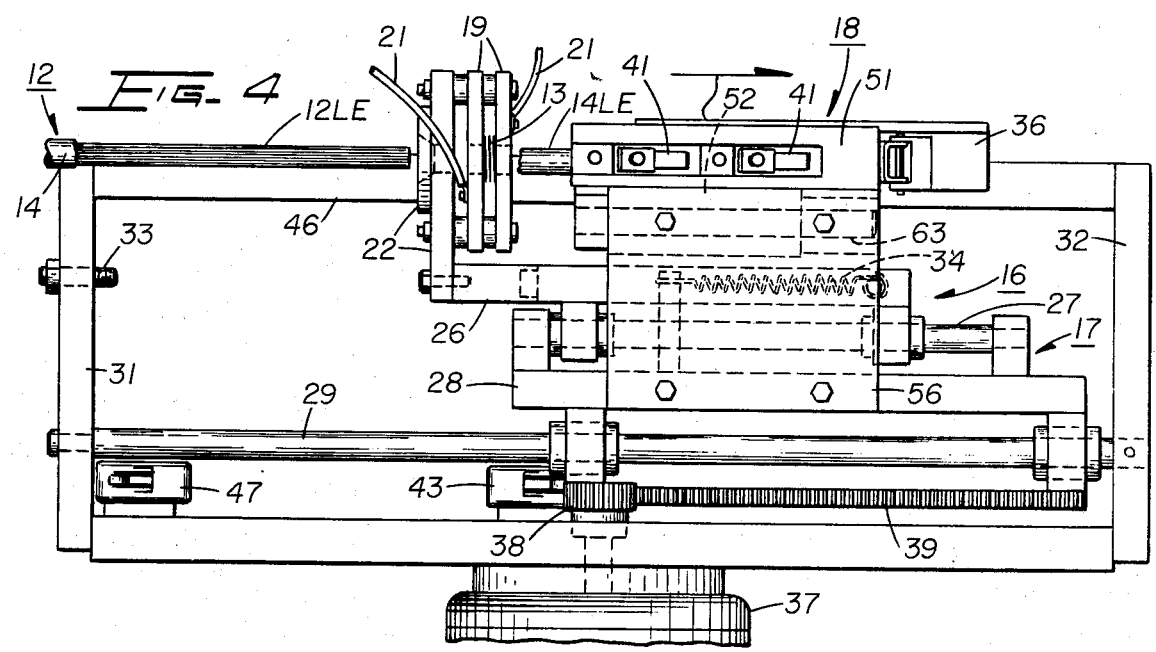

METHOD FOR SEPARATING SECTIONS OF A COVERING ON A CABLE

BACKGROUND OF THE INVENTION

1. Field of the Invention

This invention relates to a heat method and apparatus for separting sections of a covering on an article, and more particularly to a heat method and apparatus for desheathing thermoplastic jacketed cable having an irregular periphery.

2. Description of the Prior Art

A common method of desheathing the leading end portion of a thermoplastic jacketed cable involves making a circumferential cut in the jacket of the cable adjacent its leading end with a hand-held knife or other type of hand-held cutting tool, and then manually pulling the jacket leading end portion from the cable. This method is undesirable because the operator may cut through the jacket and into the insulation on the conductor wires of the cable, and in certain instances, actually nick the wires, producing defects in the cable whereby it develops shorted or open conductors in use.

The foregoing is true even in instances where the desheathing tool is of a type in which a cutting blade can be preset to produce a depth of cut corresponding to the nominal jacket thickness, because of variations in the thickness of the cable jacket. Specifically, if a cut is being made in a place where the jacket is relatively thin, the blade may cut too deep and nick the insulation on the cable conductors. In other instances, where the jacket is relatively thick, the blade will not cut deep enough to allow jacket separation without tearing of the jacket. Further, where the cable has an irregular periphery, such as in vinyl plastic jacketed cable used in PBX and telephone switching equipment, the operator must use extreme care in order to consistently make a clean uniform cut through the cable jacket around its entire periphery without damaging the insulation on the conductors.

The use of heated cable desheathing cutting blades which come into actual contact with the cable jacket to facilitate separation thereof also is known, but is undesirable for various reasons. For example, in instances where the jacket of the cable is relatively thin the heated cutting blades can pass through the jacket and damage the insulation on the cable conductors. The plastic jacket of the cable also tends to stick to the heated blades, requiring frequent cleaning thereof. Further, the heated cutting blades provide no particular advantage over an unheated blade from the standpoint of achieving a clean uniform cut about a cable having an irregular periphery.

U.S. Pat. No. 3,659,332, issued May 2, 1972 to R. F. Morrone, discloses the removal of insulation from leading end portions of the conductors of a flat cable by utilizing infrared heat to vaporize insulation on a portion of the cable spaced from the leading end thereof along a desired line of separation. Application of heat then is terminated to permit any remaining insulation in the heat zone to cool so that it will fracture when placed in tension, after which the leading end portions of the insulation are pulled from the conductors.

Also of interest to this invention is the U.S. Pat. No. 2,432,868, issued Dec. 16, 1947 to J. A. Earl et al, which is directed to the burning of insulation off of a leading end portion of a wire, and the U.S. Pat. No. 2,636,408, issued Apr. 28, 1953 to W. T. Mitchell, in which insulation on a wire is heated with high frequency electromagnetic energy to facilitate subsequent stripping of the insulation from the wire in a separate stripping device.

SUMMARY OF THE INVENTION

In accordance with this invention, portions of a thermoplastic covering on a heat-sensitive article are separated by heat-softening material in a narrow section of the covering along a desired line of separation without contacting the covering. Tension then is applied to the covering on opposite sides of the heat-softened section to separate the covering along the desired line and to expose a portion of the article. Application of heat then is terminated so as to preclude heat damage to the exposed portion of the article and to reharden the heat-softened material of the covering to form a smooth edge along the line of separation, the latter result being achieved by keeping the narrow heat-softened portion of the covering of a width such that it does not elongate any significant amount when the covering is separated along the desired line in tension.

More specifically, in one embodiment of the invention, a leading end portion of a thermoplastic jacketed cable, formed of a plurality of insulated conductors, is inserted through a continuously operating annular heat source and a narrow annular section of the cable jacket is heat-softened without contacting the jacket. Tension then is applied to the cable jacket to separate the leading end portion of the jacket from the remainder of the jacket along the heat-softened section and to expose the insulated cable conductors. The separation of the jacket, including subsequent removal of the jacket leading end portion from the cable, may be accomplished by moving a first slide assembly and a jacket gripping mechanism thereon, parallel to the cable. After the cable jacket has been separated, a second slide assembly, having the annular heat source mounted thereon, also may be moved with the first slide assembly to remove the annular heat source from the area of jacket separation and thus terminate the application of heat in the separation area, to preclude damage to the exposed insulation on the cable conductors and to permit the heat-softened material of the jacket remaining on the cable to reharden to form a smooth edge along the line of separation.

BRIEF DESCRIPTION OF THE DRAWINGS

FIG. 1 is a plan view of cable desheathing apparatus in accordance with the invention, in an advanced operating position;

FIG. 2 is a side elevational view of the cable desheathing apparatus as shown in FIG. 1, as viewed in the direction of the arrows 2—2;

FIG. 3 is a cross-sectional view of the cable desheathing apparatus, taken along the line 3—3 in FIG. 1;

FIG. 4 is a reduced plan view of the cable desheathing apparatus in a retracted operating position;

FIG. 5 is an isometric view illustrating a jacketed cable after desheathing of a leading end portion of the cable;

FIG. 6 is an enlarged partial view of the cable in FIG. 5, illustrating a cable jacket heating step in accordance with the invention; and FIG. 7 is an enlarged partial cross-sectional view of the cable shown in FIG. 5, illustrating a separation edge formed in the jacket of the desheathed cable, utilizing the method and apparatus of the subject invention.

DETAILED DESCRIPTION

Referring to FIGS. 1, 2 and 3, a cable desheathing apparatus 11 in accordance with the invention is of the same type disclosed in the copending application of R. H. Keen et al, Ser. No. 647,248, filed on even date herewith and assigned to the same assignee. In this regard, while in the illustrated embodiment of the invention a leading end portion 12LE (FIG. 5) of a thermoplastic jacketed cable 12 to be desheathed is positioned in the apparatus 11 manually, it is to be understood that the apparatus 11 may form a part of an automatic cable processing system as disclosed in that patent application. Further, while the subject invention is particularly adapted to the desheathing of cable having an irregular periphery, such as vinyl jacketed PBX or telephone switchboard cable, it also is advantageous in the desheathing of other cables having a relatively smooth periphery.

The leading end portion 12LE of the cable 12, which includes a bundle of strands in the form of thermoplastic insulated cable conductor wires 12c (FIG. 5), is inserted into the desheathing apparatus 11 so that the cable is surrounded by an annular radiant heat source, such as an electrical heat coil 13 of greater diameter than that of the cable jacket or sheathing 14, whereby the jacket is receivable through the heat coil without being engaged thereby. The cable 12 then may be manually held against longitudinal movement until the desheathing operation is completed, or may be clamped against longitudinal movement in a suitable manner, not shown.

The heat coil 13, which in the illustrated embodiment of the invention is continuously energized, may be of any suitable material, such as a nickel-chromium resistance wire, and is carried on a secondary slide assembly 16, which is mounted upon a main slide assembly 17. After the heat coil 13 has sufficiently softened a narrow annular section 14a of the thermoplastic cable jacket 14, as illustrated in FIG. 6, the main slide assembly 17 is driven to the right in FIG. 1 (which is to the left in FIG. 2) parallel to the cable leading end portion 12LE toward a retracted position as shown in FIG. 4, and a jacket gripping mechanism 18 on the main slide assembly grips a leading end portion 14LE (FIG. 5) of the cable jacket and applies tension on the jacket to separate the jacket along the circumferential center of the heat-softened section. The secondary slide assembly 16 then is moved with the main slide assembly 17 toward the retracted position in FIG. 4 to remove the heat coil 13 from the area of cable jacket separation, so as to preclude damage to the thermoplastic insulation on the cable conductors 12c, and to terminate the application of heat to the cable jacket 14 remaining on the cable, whereby the heat softened material thereof rehardens and forms a smooth edge 14e along the line of jacket separation, as illustrated in FIGS. 5 and 7.

More specifically, the heat coil 13 is supported between a pair of spaced electrical insulator blocks 19 in circular recesses therein. An integral wire portion at each end of the coil 13 extends upward adjacent a respective one of the insulator blocks 19 and is electrically connected to an electrical terminal mounted on the insulator block and having a electrical lead 21 connected thereto from an electrical power source (not shown). The insulator blocks 19 are connected together and to a vertical front plate 22 having an annular funnel-shaped cable entrance guide portion formed integral therewith, by suitable bolt and nut assemblies 23, with the insulator blocks and support plate separated by suitable spacers. The insulator blocks 19 include cable receiving apertures having a diameter on the order of the cable jacket 14, but smaller than that of the electrical heat coil 13, for supporting the jacket axially within the coil without engaging the coil. The vertical front plate 22 is mounted adjacent a vertical edge thereof by screws 24 (FIGS. 1 and 3), to a front edge of a vertically disposed support plate 26 of the secondary slide assembly 16.

The secondary slide assembly 16 is mounted for relative movement on the main slide assembly 17 by spaced bushing support members 26b fixedly mounted on the vertical support plate 26 and slidable on a pair of upper and lower guide shafts 27 fixedly mounted at their opposite ends in brackets 28s on a vertically disposed support plate 28 of the main slide assembly. The main slide assembly 17 is similarly supported for reciprocal movement by means of bushing support members 28b fixedly secured to its vertical support plate 28 and slidable on a pair of upper and lower guide shafts 29 fixedly mounted at their opposite ends on frame members 31 and 32 of the desheathing apparatus 11. The secondary slide assembly 16 is biased on the main slide assembly 17 to the left, as viewed in FIG. 1 (to the right as viewed in FIG. 2), against an adjustable stop screw 33 mounted in the frame member 31, by a coil spring 34 connected between the slide vertical support plates 26 and 28.

Movement of the cable 12 into the desheathing apparatus 11 is limited by the leading end of the cable engaging an actuating arm 36a of a limit switch 36 and pivoting the arm against a rigid stop member 36c (FIG. 2). Pivoting of the actuating arm 36a closes the limit switch 36 to cause operation of a time delay relay (not shown), which after a short time period (a few seconds) which is sufficient to cause the necessary softening of the narrow annular section 14a (FIG. 6) of the cable jacket 14 by radiant heat from the heat coil 13, energizes a reversible drive motor 37 mounted on the frame of the desheathing apparatus 11. The motor 37, which has a gear 38 engaged with a gear rack 39 fixedly mounted on the bushing support members 28b of the main slide assembly 17, then causes the main slide assembly to move parallel to the cable 12 to the right in FIG. 1, as above-described, toward a retracted position. Under certain conditions where the use of an intermittently operated heat coil 13 may be desirable, the aforementioned time delay relay can be used to de-energize the heat coil to terminate the application of heat to the cable 12.

As is best shown in FIGS. 2 and 3, the cable jacket gripping mechanism 18 includes a set of one-way gripping blades 41 extending downward in the direction of the cable feed into the apparatus 11, and an opposed hinged trapdoor 42 for insuring positive engagement of the blades with the cable jacket 14. Thus, during the initial movement of the main slide assembly 17, the hinged trapdoor 42 and the gripping blades 41, which permit initial entry of the cable 12 into the desheathing apparatus 11, but which bite into the cable jacket 14 to preclude relative movement between the jacket and the gripping blades in the opposite direction, cooperate to cause the leading end portion 14LE of the jacket to move longitudinally relative to the cable, thereby causing the cable jacket to separate in tension along the circumferential center of the softened annular jacket section 14a (FIG. 6). At the same time, the main slide assembly 17 moves relative to the spring-biased secondary slide assembly 16 to withdraw the jacket leading end portion 14LE from within the heat coil 13 and the innermost insulator block 19, to prevent excessive melting of the jacket portion and to permit subsequent discharge of the jacket portion from the apparatus without interference from the heat coil and the insulator block. The left-hand shaft support bracket 28s (as viewed in FIG. 1) or the main slide assembly 17 then engages the adjacent mounting bushing 26b of the secondary slide assembly 16 to cause the secondary slide assembly and the heat coil 13 to move with the main slide assembly.

The secondary and main slide assemblies 16 and 17 travel together to the right in FIG. 1 (to the left in FIG. 2) to the retracted position shown in FIG. 4, until the left-hand shaft support bracket 28b (as viewed in FIG. 1) of the main slide assembly rides over a limit switch 43 (FIGS. 2 and 3) on the apparatus frame, to de-energize the drive motor 37. As is illustrated in FIG. 2, during this travel a cam follower 44 on the hinged trap door 42 rides into a depressed portion of a cam track 46 on the apparatus frame to permit the trap door to pivot to an open position, thereby discharging the removed leading end portion 14LE of the cable jacket 14 into a suitable receptacle.

The now desheathed cable 12 is removed from the desheathing apparatus by the operator, who may then actuate a reset switch (not shown) to reverse the drive of the motor 37, which then returns the slide assemblies 16 and 17 to their original positions for another desheathing operation. As the main slide assembly 17 reaches its original position, the motor 37 is de-energized by the left-hand (FIG. 1) bushing support member 28b operating a limit switch 47 on the apparatus frame. The slide assembly 17 then is retained in this position as the next cable leading end portion 12LE is inserted in the apparatus, by internal braking action of the motor 37 or by a suitable solenoid-operated latching device, not shown.

Each of the jacket gripping blades 41 is of resilient leaf-spring construction and is suitably mounted (e.g., by a screw and a retaining plate) adjacent its upper end on a respective blade holder 48. As is best shown in FIGS. 2 and 3, each blade holder 48 is located in a longitudinal slot defined by opposed spaced upper side walls of a generally H-shaped mounting member 51 and is fixedly mounted (e.g., by a screw) on the top of one of a plurality of intermediate spacer portions 51s of the H-shaped mounting member. The mounting member 51 is secured to a depending support bracket 52 by screws 53, and the support bracket 52 is connected at its upper end by screws 54 to the bottom of a horizontal top plate 56 adjacent one side thereof. The top plate 56 is mounted adjacent an opposite side by screws 57 to the upper edge of the main slide vertical support plate 28. A lower end portion of the gripping blade 41 projects downward through an opening in the H-shaped mounting member 51 into an elongated cable receiving cavity defined by a lower longitudinal slot in the mounting member and the trap door 42. The limit switch 36 also is supported on the mounting member 51 so as to block one end of the thus defined cavity, by an arm 58 and two of the screws 53.

The trap door 42 is secured adjacent its opposite ends to hinge members 61 and 62 (FIGS. 1 and 3), with the hinge member 61 carrying the cam follower 44. As is best shown in FIGS. 1 and 3, the hinge members 61 and 62 are fixedly mounted, by means of integral apertured ear portions and set screws, to respective opposite ends of a pivot shaft 63 journalled in a depending portion of the support bracket 52. The trap door 42 may pivot to its open position solely by gravity, and discharge of the jacket leading end portion 14LE may be accomplished solely by gravity, or a small leaf spring (not shown) for facilitating discharge of the jacket leading end portion may be suitably mounted on one of the mounting member spacer portions 51s, if so desired.

The temperature of the electrical heat coil 13 and the duration of exposure of the thermoplastic cable jacket 14 thereto, in order to soften the narrow annular section 14a of the jacket so that it will separate properly without tearing (insufficient heat-softening) or elongating (excessive heat-softening so as to cause "stringing out"), and then reharden or coalesce to form the smooth edge 14e, will vary depending on the material involved. By way of illustration, however, in the case of a vinyl jacketed cable 12, by adjusting the temperature of the electrical heat coil 13 with a rheostat (not shown) in a known manner, favorable results have been achieved with a heat-exposure time of 3-4 seconds. Similarly, to avoid excessive elongation or "stringing out" of the cable jacket 14 during the jacket separating operation, whereby the jacket will not reharden to form the smooth edge 14e, the width of the narrow heat-softened annular section 14a of the jacket preferably is kept on the order of ⅛ inch or less, this dimension being readily controlled by varying the axial length of the heat coil 13 (i.e., the spacing between the insulator blocks 19).

In summary, a new method and apparatus for desheathing a thermoplastic jacketed cable 12 has been provided which is rapid and economical to use, and which provides a clean uniform separation of the cable jacket 14 without damaging the insulated conductors 12c of the cable during the desheathing process, whereby the cable subsequently could develop shorted or open conductors in operation. More specifically, the heat-softening of the narrow annular section 14a of the cable jacket 14 and then applying tension to the jacket on opposite sides of the heat-softened section, causes the jacket to separate along a desired line and then reharden to produce the smooth edge 14e on the jacket remaining on the cable, as illustrated in FIGS. 5 and 7, when application of heat to the jacket is terminated. This result is achieved despite variations in jacket thickness, without nicking, cutting or otherwise damaging the insulated cable conductors 12c because of a thinner-than-nominal jacket thickness, and without tearing of the jacket because of a thicker-than-nominal jacket thickness, which have been prevalent problems with prior known blade cutting techniques. Further, the disclosed method and apparatus are particularly advantageous in the desheathing of jacketed cable 12 having an irregular periphery from the standpoint of achieving a clean uniform separation of the jacket 14 about its entire circumference, since actual contact with the jacket for proper separation thereof is unnecessary.

What is claimed is:

1. A method of desheathing a round cable formed of a thermoplastic cable jacket enclosing a plurality of conductors having thermoplastic insulation thereon, which comprises:

surrounding an annular section of the thermoplastic cable jacket adjacent a leading end portion of the cable with an annular heat source;

heat-softening the material of the annular cable jacket section about the entire circumference thereof without contacting the jacket and without softening the thermoplastic insulation on the conductors, the width of the heat-softened section being sufficiently narrow that it will not elongate any significant amount when the jacket is separated along a line defined by the heat-softened circumferential section upon the application of longitudinal tension to the jacket, whereby the separated heat-softened material of the section will reharden to form a relatively smooth edge along the line of separation when application of heat thereto is terminated;

applying tension to the cable jacket on opposite sides of the heat-softened annular section to separate the jacket along the heat-softened section and to expose the insulated conductors;

terminating the application of heat upon separation of said jacket and within a time sufficient to preclude damage to the exposed insulation on the cable conductors and to reharden the heat-softened material of the remaining jacket on the cable to form a smooth edge along the line of separation of the jacket; and removing the leading end portion of the jacket from the cable.

2. A method as recited in claim 1, in which: application of heat to the heat-softened material of the remaining jacket on the cable is terminated by imparting relative axial movement between the cable and the annular heat source.

3. In a method of removing a length of thermoplastic sheathing from the end of a sheathed cable having a plurality of heat-sensitive insulated strands, the steps of:

applying sufficient heat about the entire circumference of said sheathed cable to soften an annular band of sheathing at a distance from the end of said sheathed cable equal to the length of sheathing to be removed;

applying opposed forces to said sheathing on opposite sides of said softened annular band to separate said sheathing along a circumferential line intermediate the longitudinal extremities of said annular band and expose sections of said insulated strands; and shifting the application of heat along said cable upon separation of said sheathing and exposure of said sections of said insulated strands to preclude application of sufficient heat to detrimentally affect said exposed sections, while applying a longitudinal pulling force to said separated length of sheathing to remove said length from the strands.

4. In a method of removing a thermoplastic jacket from an enclosed bundle of conductors, each of which has a thermoplastic insulation:

applying sufficient heat circumferentially about the entire circumference of an annular section of the jacket for sufficient time to soften a complete circumferential section of the thermoplastic jacket without softening the thermoplastic insulation on the bundle of conductors;

holding a first section of jacket on a first side of the heat softened circumferential section while applying a tension force to a second section of the jacket on the other side of the heat softened circumferential section to separate the jacket at said circumferential section and expose a circumferential section of the bundle of conductors; and interrupting the application of heat upon separation of said jacket and exposure of the bundle of conductors and within a time to preclude heat softening of the insulation on said exposed section of the bundle of conductors.

5. In a method as defined in claim 4, wherein said heat interruption step includes applying a force to move the application of heat along said jacket to dissipate the amount of heat applied to the jacket to such an extent that the jacket is not further softened.

* * * * *